UNITED STATES PATENT OFFICE.

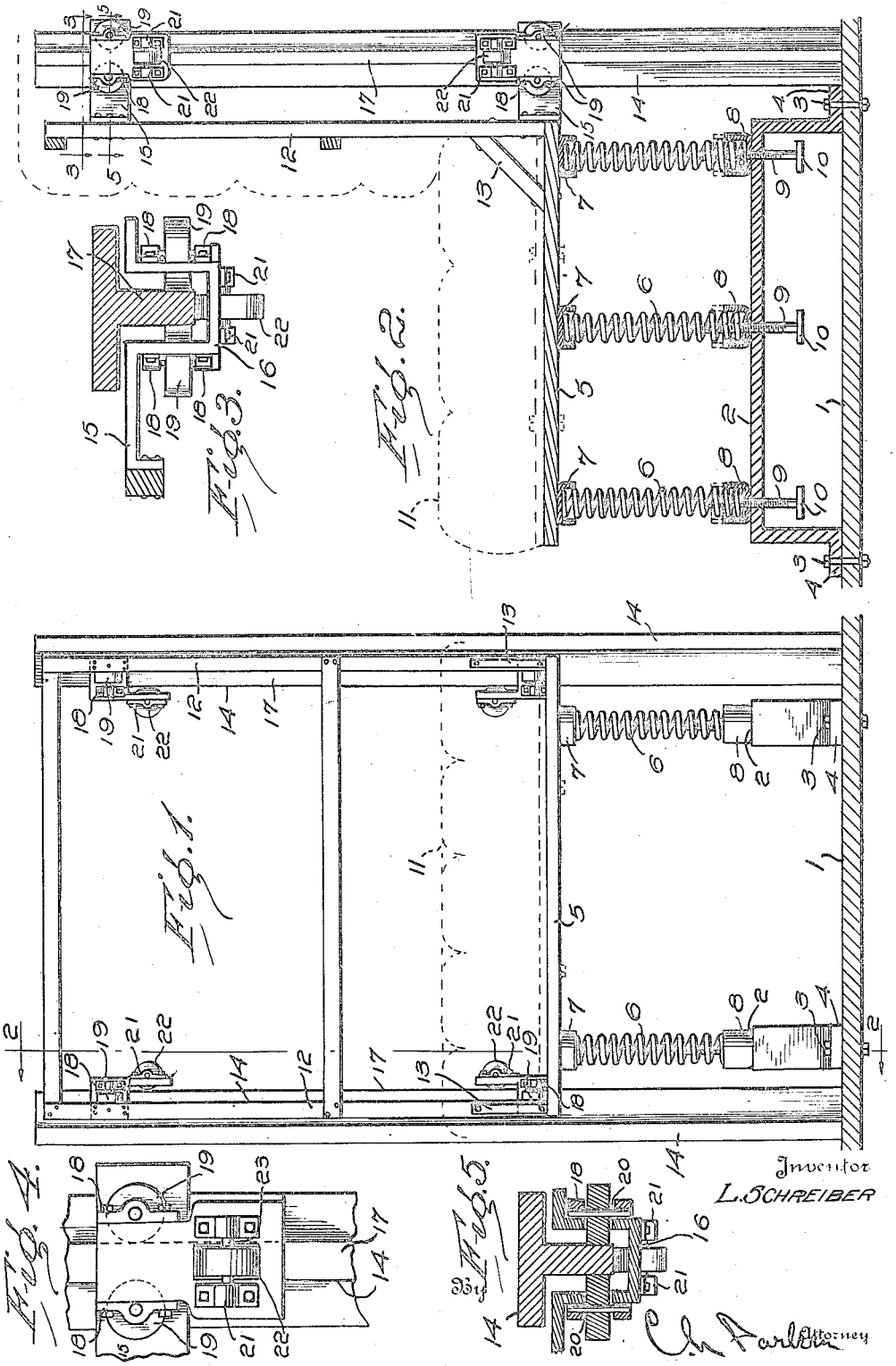

LOUIS SCHREIBER, OF HOLLAND, MICHIGAN.

SPRING SEAT.

1,423,460.	Specification of Letters Patent.	Patented July 18, 1922.

Application filed August 29, 1921. Serial No. 496,369.

*To all whom it may concern:*

Be it known that I, LOUIS SCHREIBER, a citizen of the United States, residing at Holland, in the county of Ottawa and State of Michigan, have invented certain new and useful Improvements in Spring-Seats, of which the following is a specification.

This invention relates to spring seats particularly adapted for use in automobiles, railway cars, carriages, and other vehicles.

An object of the invention is the production of a spring supported seat and back movable as a unit.

A further object is the provision of a seat and back movable on vertical guides to permit the seat to move independently of the motion of the vehicle, and thus absorb the shocks and jars incidental to the travel of the vehicle over a roadway.

A further object is the provision of means for adjusting the tension of the supporting springs.

In the accompanying drawings, I have shown one embodiment of the invention. In this showing:

Figure 1 is a front elevation of a seat frame,

Figure 2 is a vertical sectional view on line 2—2 of Figure 1,

Figure 3 is a horizontal sectional view on line 3—3 of Figure 2,

Figure 4 is a side elevation of a portion of one of the vertical guides, and,

Figure 5 is a horizontal sectional view on line 5—5 of Figure 2.

Referring to the drawings, the reference numeral 1 designates a suitable base or foundation such as a floor of a car or other vehicle. A pair of brackets 2 forming the base of the seat are secured to the floor in any suitable manner, as by means of bolts 3, passing through flanges 4, formed at the ends of the bracket. The bottom 5 of the seat is supported above these brackets by means of coil springs 6. These springs are received in spring cups 7 carried on the under side of the bottom of the seat, the other end of the springs being received in similar cups 8 arranged on the top of the brackets. The cups 8 are provided with threaded openings for the reception of threaded rods 9 passing through threaded openings in the brackets 2. The threaded rods are provided with suitable heads 10. A cushion 11, shown in dotted lines, may be arranged on the bottom of the seat in the usual manner. The back 12 is secured to the bottom by means of suitable braces 13 and is adapted to move therewith. A pair of T-shaped guides 14 are arranged adjacent the back of the seat adapted to guide the bottom and back when moved vertically. As shown, the back is provided with brackets 15, each of which is provided with an offset portion 16 adapted to embrace the arms 17 of the T-shaped guide. The bracket is provided with openings on opposite sides and ears 18 are arranged adjacent the openings. Rollers 19 are mounted on suitable shafts 20, the shafts being journaled in the ears 18 and the rollers passing through the openings in the sides of the bracket and engaging opposite sides of the arms 17. The outer face of the offset portion 16 of the bracket is also provided with an opening arranged below the horizontal plane of the rollers 19. Suitable bearings 21 are arranged adjacent this opening and a roller 22 is mounted on the shaft or pin 23, supported in the bearings 21, the roller engaging the front of the arm 17. From the above description, it will be apparent that the seat and back are vertically movable independent of the movement of the vehicle in which the seat is used. The vertical guides maintain the seat and back in proper position at all times. The provision of rollers engaging three sides of the vertical guides prevents the parts from becoming displaced, and the arrangement of one roller in a horizontal plane beneath the plane of the other two rollers prevents side play. The tension of the springs 6 may be adjusted as desired by moving the cups vertically, as indicated in dotted lines in Figure 2 of the drawings.

It is to be understood that the form of the invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A spring seat comprising a base, springs arranged on said base, a seat bottom arranged on said springs, a back secured to said seat bottom, a guide arranged adjacent said back near each side thereof, brackets secured to said back adjacent said guides, a pair of rollers carried by each of said brackets and engaging opposite sides of said guides, the axes of said rollers being arranged parallel to said back, and a roller carried by each of said brackets, the axes of said last named rollers being arranged at right angles to said back and adapted to engage the inner faces of said guides.

2. A spring seat comprising a base, springs arranged on said base, a seat bottom arranged on said springs, a back secured to said seat bottom, guides arranged adjacent said back near each side thereof, each of said guides including a flange arranged parallel to said back, brackets secured to said back adjacent said guides, each of said brackets including a substantially U-shaped portion adapted to receive the flanges of said guides, rollers carried by the legs of the U-shaped portions of said brackets and engaging opposite sides of said flanges, and a roller carried by the base of the U-shaped portion of each of said brackets and engaging the edges of said flanges.

In testimony whereof I affix my signature in presence of two witnesses.

LOUIS SCHREIBER.

Witnesses:
ANNA NYEUHIES,
CLARENCE A. LOKKER.